Oct. 26, 1926.
T. JACOBSEN
1,604,516
HOUSE WIRING CASING
Filed July 22, 1922
2 Sheets-Sheet 1
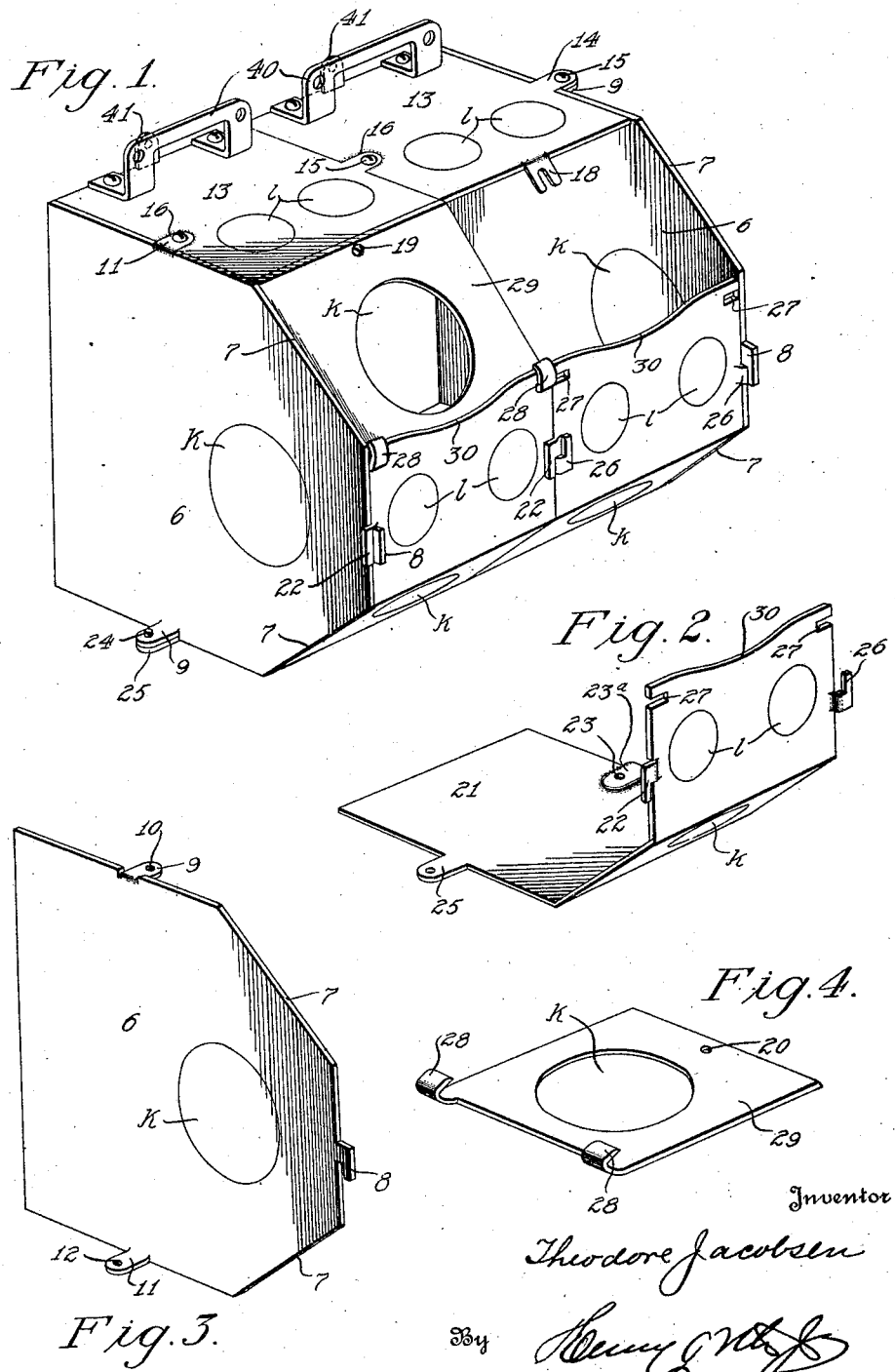
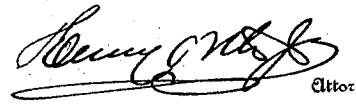

Oct. 26, 1926.

T. JACOBSEN 1,604,516

HOUSE WIRING CASING

Filed July 22, 1922

Inventor
Theodore Jacobsen
By Henry Orth Jr.
Attorney

Patented Oct. 26, 1926.

1,604,516

UNITED STATES PATENT OFFICE.

THEODORE JACOBSEN, OF WATERBURY, CONNECTICUT.

HOUSE-WIRING CASING.

Application filed July 22, 1922. Serial No. 576,707.

My invention relates to a casing for electrical devices such as outlet or switch boxes, junction boxes and plug casings, for electrical house wiring, and my invention is adapted for use as a wall box unit which can be enlarged by connecting a number of the individual boxes or units together, as will hereinafter be more fully explained.

I am aware that sectional boxes of this type have heretofore been made, but I believe I am the first to produce a section or a box composed of a number of units, having a removable wall to which the metallic flexible tubing of a house cable is connected, while the box is outside of the wall of the room, whereupon the box is inserted into the hole in the plastered house wall. The removable metallic wall of the box thus allows a certain amount of relative movement between the ends of the metallic tube and the main portion of the box during the insertion of the box into its hole in the plaster. The metallic tubes are fairly stiff and after having been fished through the wall opening and there secured in a rigid box it is difficult or almost impossible to bend these tubes to get their protruding ends back into the wall while inserting the box in its allotted place in the wall.

On the other hand, as is now customary, it is difficult to first secure the box in place in the wall and then fasten the ends of the metallic flexible tubing to the box.

To this end I make one or more of the sides of the box movable, preferably removably hinged, so that this hinged portion, which has secured to it at its knock-out hole the end of the flexible metallic tubing, shall have movement relative to the rest of the box as the flexible tubing is pushed back through the switch opening into the wall of the room while the box is being placed in its permanent position. After this the removable box wall or hinged portion is secured or locked in place by any suitable means, preferably by a screw inserted from the inside of the box. The usual switch mechanism or porcelain is then placed in this box and secured in the usual manner.

In order that my invention may be more fully understood, reference will be made to the accompanying drawings in which like parts are similarly designated and in which:

Figure 1 is a perspective view of my sectional box seen from the rear; two assembled sections being illustrated, one of said sections being shown with the door removed;

Fig. 2 is a perspective view of one of the plates forming the back and bottom;

Fig. 3 is a perspective view of a side member;

Fig. 4 is a perspective view of the removable wall or door, detached;

Figure 5:
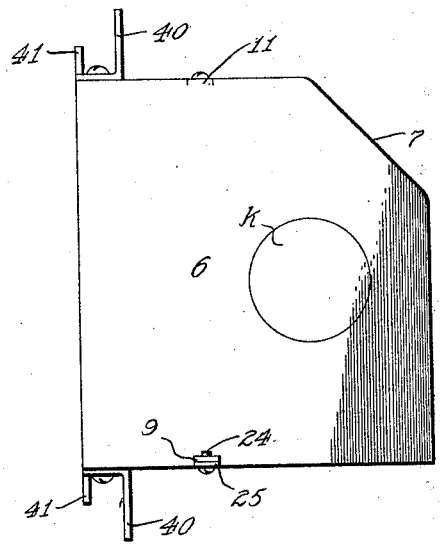
Fig. 5 is a side elevation of a modification.

A single unit has two side members 6. These two side plates are duplicates of one another, but lie in reversed position when assembled. Such a side is clearly shown in Fig. 3 having one or both corners bevelled at 7 with a hook 8 lying preferably in the plane of the side 6 projecting from the rear edge preferably near its middle and integral therewith. The side plate 6 which is an irregular hexagon also has a lug 9 projecting to one side thereof that has a threaded hole 10 and an oppositely projecting lug 11 with a non-threaded hole 12. The side member 6 is symmetrical so that it may be used for both sides of the unit or sectional casing.

Secured between a pair of these side members 6 of the unit is a plate 13, Fig. 1, which plate is customarily but not necessarily at the top of the box and has a lug 14 on one edge, that registers with the lug 9 on one side member 6, and is secured thereto by a screw 15, and at the opposite edge of plate 13 is a depression 16 for receiving the lug 11 of a second and reversed side member 6 and screw 15. This plate is provided with one or more knock-outs of any desired size, here shown as loom knock-outs 1. This plate also has a lug 18 preferably forked through which passes a screw 19, that enters a threaded hole 20 in a removable door or wall 29 for fastening the latter.

At three sides of the member 6 is a bent plate 21. This plate is provided with a hook 22 preferably displaced from the plane of the metal by the thickness of the sheet metal and integral therewith. The purpose of this hook 22 is to engage hook 8 on the side member 6. The plate 21 is also provided with a threaded hole 23 in a depression 23ª for the reception of the screw 24 (Fig. 5) that passes through the lug 11, and at the opposite edge of the plate 21 I provide a lug 25 that registers either with lug 9 on the side 6 or with a like hole 23 in the adjacent unit of a built up section. Opposite the hook 22 on the plate 21 is a reversely directed hook 26 that may engage the hook 8 on the opposite side member 6 or a like hook 22 on an adjacent unit.

Slots 27 at each lateral edge of the plate 21 receive hooks 28 forming hinges of the removable door or wall 29 of the box. Said wall is provided with one or more knockouts k. It is customary to secure the ends of the flexible metallic tubing at the knockouts by means of removable clamps, not shown, and which form no part of the present invention.

After the flexible tubing has been secured to the door 29, the edge of the latter having the hooks 28 formed thereon is passed into the box below the edge 30 far enough to permit the hooks to be drawn through the slots 27 by a slight backward movement of the door. The lower edge of the door 29 will when the latter is closed lie below said edge 30 and against the inside face of the back plate, the upper edge of the door rests against the rear edge of the plate 13, as shown in Fig. 1, so that the door when closed cannot move sufficiently to permit accidental disengagement of the hooks.

In order that the clamp may not engage the box edge and thereby prevent the insertion of the hooks into the slots the upper edge 30 is cut away thus permitting sufficient insertion of the door into the box to effect a quick and easy connection of the hooks with the slots.

Figure 6:
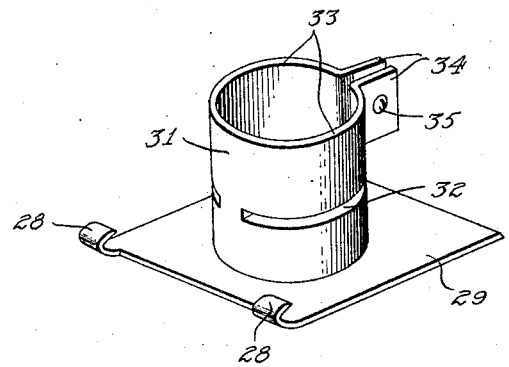
Fig. 6 is a perspective view of a door with a permanent attached clamp.
Figure 7:
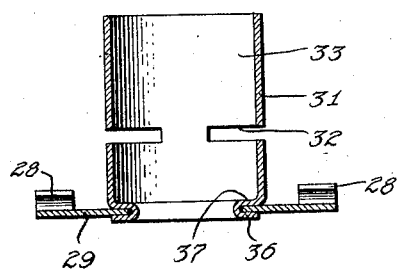
Fig. 7 is a central transverse section of Fig. 6.

In lieu of the customary removable clamps, I form the door or removable wall of the outlet box as shown in Figs. 6 and 7, wherein I provide a sheet metal sleeve 31 provided with a transverse cut 32 to form a pair of spring clamps 33 having outwardly extending lugs 34 through which pass a tightening screw 35 for tightening the clamps 33 onto the end of the metallic flexible tubing or other conduit that armors the cable entering the wall box. This sleeve 31 is on the outside of the door 29 and crimps inward and over the edge of the cable opening by crimps 36, as shown in Fig. 7, thereby forming a shoulder 37 against which the end of the flexible metal tube abuts while providing a rounded restricted opening for the passage of the insulated wires or the cable. It is of course obvious that I may make my casing with only one bevelled side or cut-off corner as shown in Fig. 5 or the casing may not be bevelled at all. It is however preferable to bevel the casing and place the removable or hinged wall on this bevel so that when the removable wall is open it will not project too far above or below the casing as it is being inserted in its hole in the plastering which should be cut to a neat fit.

The usual lugs 40 are provided for securing the unit or a built up box to the laths at the opening in the plastered wall and also the usual lugs 41 by means of which the porcelain is secured within the box.

Ordinarily only one removable wall or door 29 will be sufficient, whether the unit have one cut-off corner as in Fig. 5 or two cut-off corners as in Fig. 1, but where desired an additional door may be used on the second cut-off corner Fig. 1 and I do not limit my invention to the use of a hinged or otherwise removable box wall at only one side or corner of the box, said wall constructed to have the cable end fastened thereto and brought to closed position by the insertion of the box into the hole in the plastered wall of the house.

I claim:

1. An electrical outlet or junction box comprising a casing, a removable rear wall having an opening in which an electrical conduit is secured, and means on the casing and rear wall operable by a relative movement thereof to pivotally connect the parts together.

2. An electrical outlet or junction box, comprising a casing, a flat, removable plate forming a rear wall having an opening in which an electrical conduit is to be secured, means on the casing and rear wall to permit hooked engagement between them by relative movement of casing and wall and means to fasten the wall to the casing.

3. An electrical outlet or junction box comprising a casing having at least one cut-off rear corner, a removable door for closing said corner having an opening in which an electrical conduit is secured, and means for pivotally connecting the door to the casing, and means inside the casing for securing the door to the latter.

4. A casing unit such as described having two side members each having a cut off corner, a plate for connecting the opposite edges of opposite members at one of their uncut portions, a single bent plate connecting said side members and forming a plurality of faces for said unit, and a removable plate wall interposed between the said two plates at said cut-off corner.

5. A casing unit as described having side members whose rear corners are cut off to form a hexagon, a rectangular top plate connecting edges of the hexagonal sides, a bent plate connecting other edges of said sides and spaced from said rectangular plate, and a rectangular door hinged to the latter plate and extending between cut-off corners of said side members.

6. A casing comprising side members each having a cut-off rear corner, a removable door at such corner provided with conduit attaching opening, the edge of the casing at the rear of said door being cut away to receive a conduit attaching clamp attached to said door, whereby the latter may be moved into position for attachment to said casing.

7. An electrical outlet or junction box having side plates and alternate fixed and hinged plates between the side plates, and means for detachably connecting the fixed plates to the side plates.

8. A house wiring casing having a plurality of connected integral sides having edge slots or notches at one end and said end having a cut away portion between said slots and a detachable door having hinge hooks engaging said slots.

9. An electrical outlet or junction box open at its front end and having side plates, a short plate and a long plate forming a plurality of other sides of the box between and detachably connected to the side plates, and an inclined removable plate arranged for hooked connection between the long and short plates.

In testimony that I claim the foregoing as my invention, I have signed my name.

THEODORE JACOBSEN.